Claude T. Smith.
George W. Forsythe.
Inventors

C. T. SMITH & G. W. FORSYTHE.
CUSHION WHEEL.
APPLICATION FILED APR. 24, 1918.
1,295,379.
Patented Feb. 25, 1919.
4 SHEETS—SHEET 2.
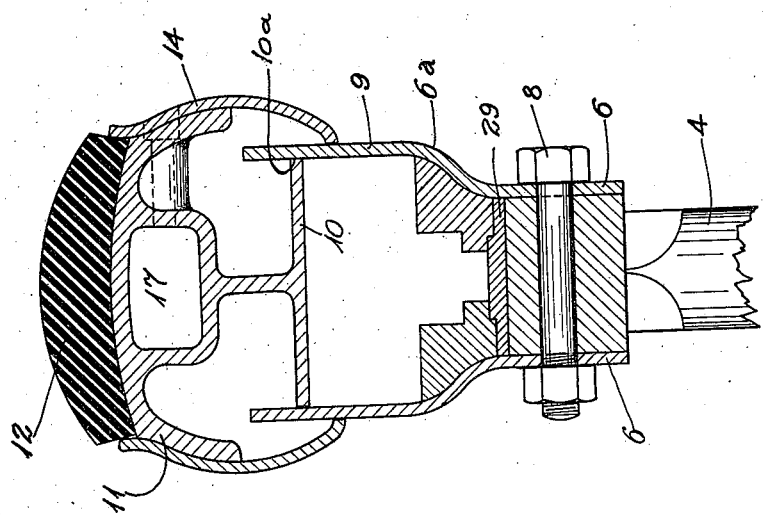
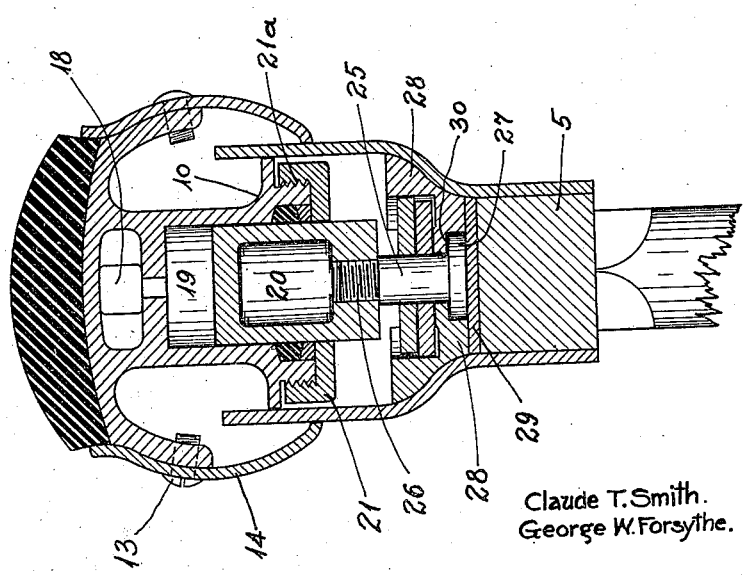
Claude T. Smith.
George W. Forsythe. Inventors

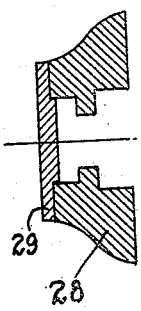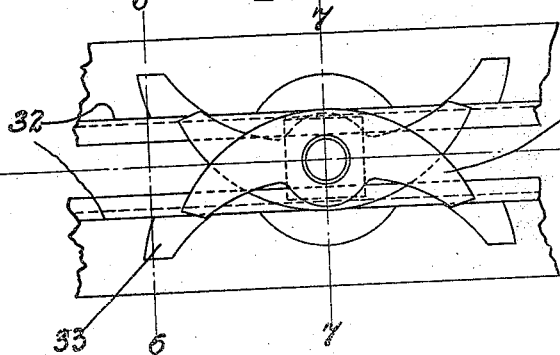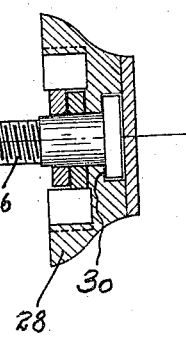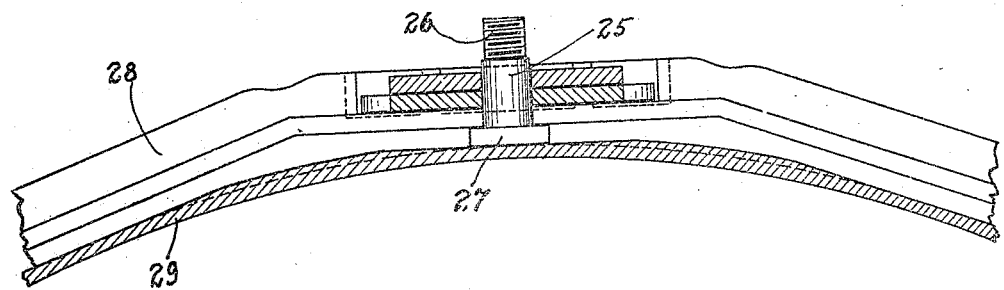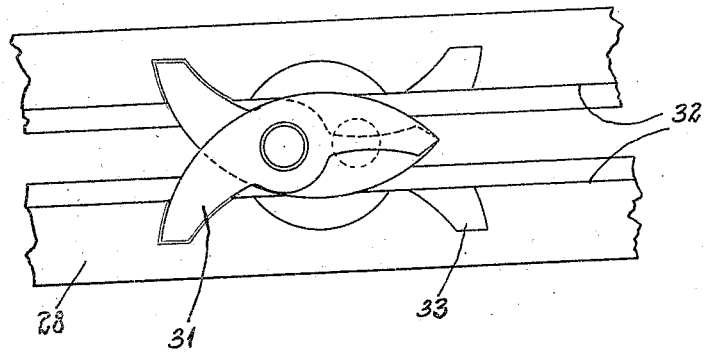

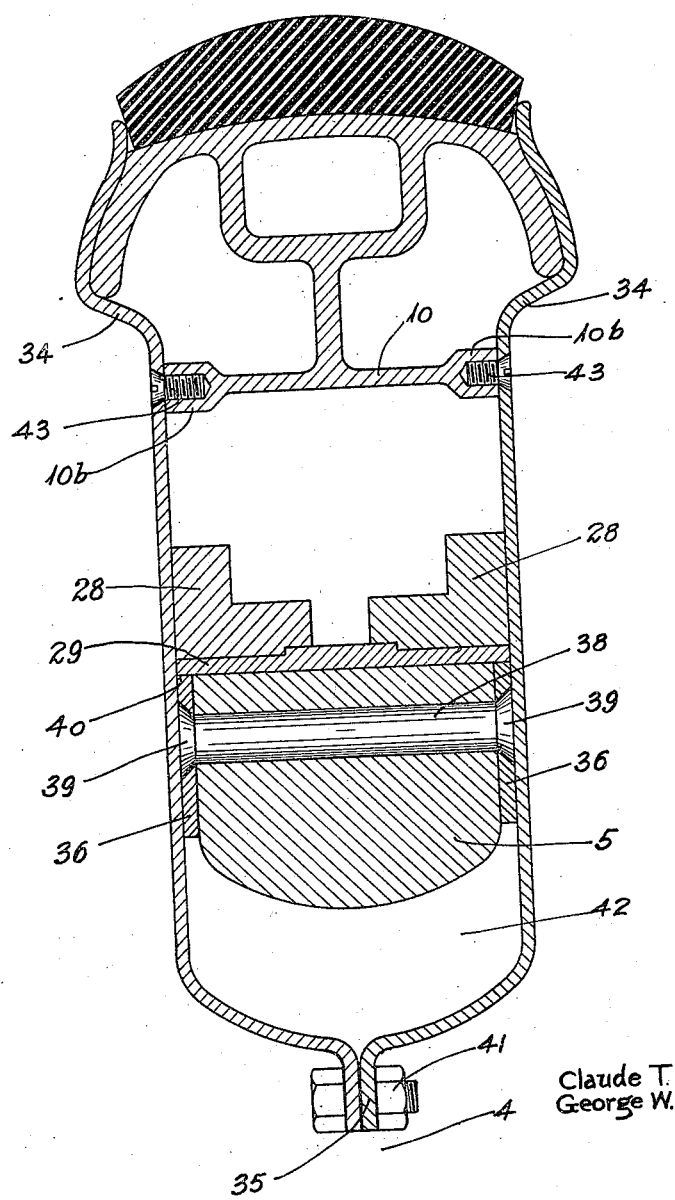

UNITED STATES PATENT OFFICE.

CLAUDE T. SMITH AND GEORGE W. FORSYTHE, OF DENVER, COLORADO.

CUSHION-WHEEL.

1,295,379.  Specification of Letters Patent.  Patented Feb. 25, 1919.

Application filed April 24, 1918. Serial No. 230,504.

*To all whom it may concern:*

Be it known that we, CLAUDE T. SMITH and GEORGE W. FORSYTHE, citizens of the United States, residing at Denver, in the county of Denver and State of Colorado, have invented certain new and useful Improvements in Cushion-Wheels; and we do hereby declare the following to be a full, clear, and exact description of the invention, such as will enable others skilled in the art to which it appertains to make and use the same.

This invention relates to vehicle wheels and more particularly to an improvement in wheels of the type having a relatively movable central structure and a peripheral tire member.

It is one of the objects of the present invention to provide a puncture-proof wheel with parts so connected, organized and constructed as to eliminate the requirement of the usual pneumatic or rubber tires and yet provide for the desirable degree of resiliency between the tire and the wheel structure. A further object of the invention is to provide the construction of resilient wheels by the utilization of relatively movable members of the utmost simplicity for transferring the pressure from the center structure to the tire member, this movement being controlled by the reaction of a fluid medium, preferably liquid. Another object of the invention is to provide a wheel involving relatively movable fluid controlled elements in combination with means for permitting radial non-lateral movement of the tire with relation to the central structure, and which parts may be assembled and disassembled with facility and be of simple, practical, durable, and reliable construction.

A further object of the present invention is to provide for the most direct form of connection for transmitting pressure from the central structure to the fluid in the tire structure and to provide also for relative movement of connecting means between these parts, and to provide for the limitation of such movements so as to secure the necessary positive connection between the parts to obtain rotative action simultaneously of the parts for traction purposes.

With these and other objects in view as will be well understood by those versed in the art, the invention consists in the construction, the combination, and in the details and organization of the parts as more particularly set forth in the following specification relative to the embodiment of the invention illustrated in the accompanying drawings, in which—

Fig. 2 is a radial transverse section through one of the cylinders and the tire and the wheel structure.

Fig. 3 is a radial transverse section through the tire and wheel structure in a plane intermediate a pair of pistons and their chambers.

Fig. 4 is a longitudinal central section through a portion of the wheel rim showing the piston stud in elevation and the tumblers thereon in section.

Fig. 5 is a plan view of the device shown in Fig. 4.

Fig. 6 is a transverse section through the rim members on line 6—6 of Fig. 5.

Fig. 7 is a transverse section on line 7—7 of Fig. 5.

Fig. 8 is a plan view showing the tumblers as in interlocking position with the keeper notches.

Fig. 9 is a radial transverse section through the tire and wheel structure of another embodiment of the invention, in a plane intermediate two pistons and likewise intermediate two spokes.

Figure 1:
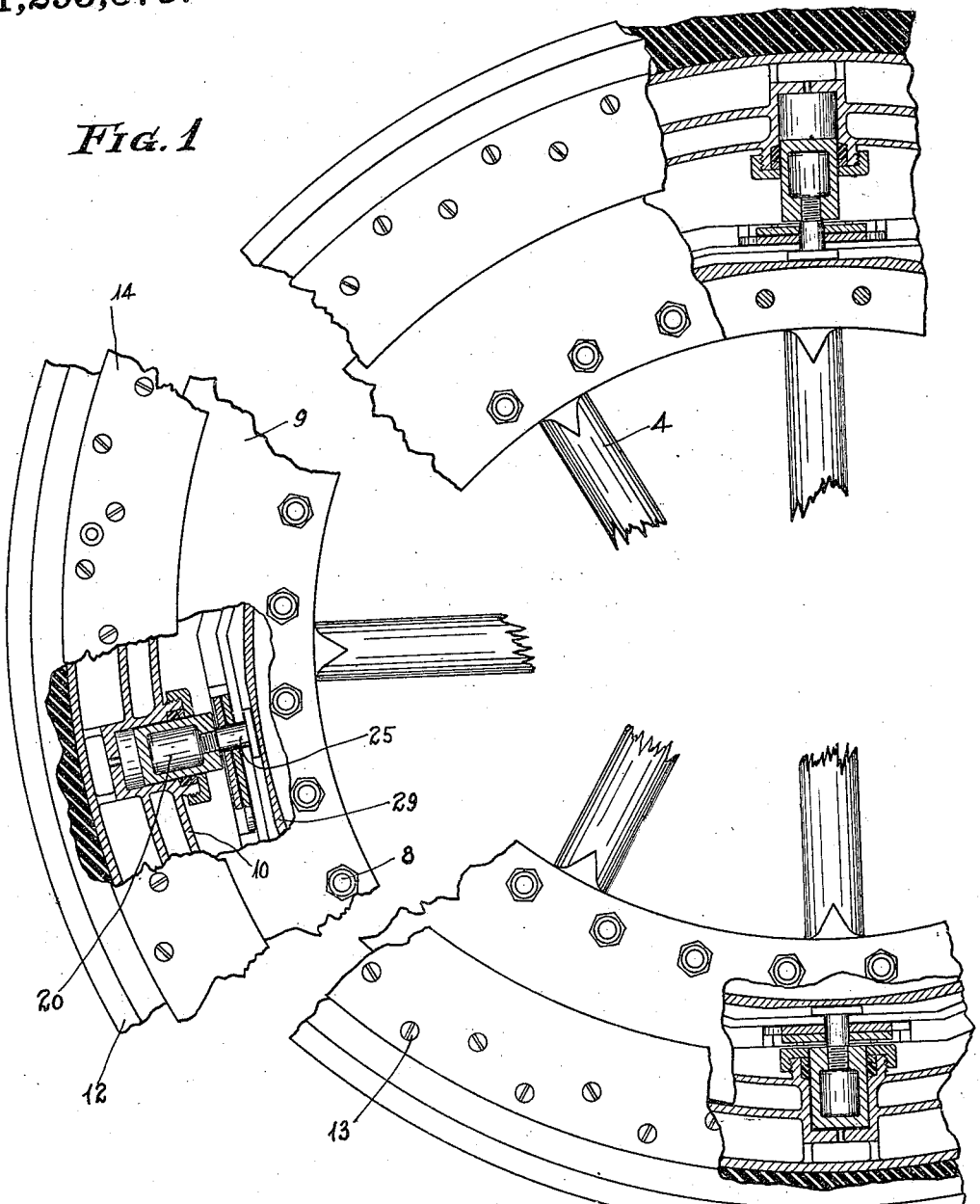
Figure 1 is a side elevation of fragments of the wheel involving the present improvements, showing the parts in positions assumed at different locations about the wheel.

In the embodiment of the invention illustrated in all figures except Fig. 9, a central wheel structure embodies a series of spokes 4 and is provided with any suitable felly 5, bolted as at 8 or otherwise secured to the sides of which are radially extending side plates 6—6 which preferably are flared laterally as at 6ª and are extended into flat annular flanges 9 projecting beyond the peripheral face of the felly 5 and embrace a central projecting portion 10 formed of or connected to an outer annular tire structure shown in the form of a shell 11, which may be provided with a rubber tread portion 12, designed to take the minor road shocks and eliminate noise of contact. Suitably secured to the side flanges of the shell 11 as by screws 13 or other suitable means are outer side plates 14, the central edges of which slidably operate upon the outer surfaces of the bearing portions 9 of the side plates 6.

The shell 11 is provided, as above stated, with a central inwardly projecting portion 10, the outer part of which is designed to form an endless circular fluid-receiving chamber or compartment 17 of suitable proportions and which communicates, through lead orifices 18, with each of a plurality of piston chambers 19, which are shown as radially disposed and in which reciprocate respective pistons 20, the radial inner ends of which are embraced by packing glands 21, which are shown as provided with internally threaded flanges 21ª to engage respective portions formed on the body part 10, this being for the purpose of preventing the escape of oil or such other fluid as may be used from the space within the central annular chamber of the shell.

One of the important features of the present invention relates to the connection established between the pistons 20 and the central wheel structure 4, it being an especial object of the invention to secure simplicity of construction and operation and efficiency in the driving function of the device, and to that end, each piston is shown as having an extension represented as a stud 25, having an end 26 threaded into the central end of the pistons 20, this stud having at its opposite end a flange or head 27 which is slidably mounted between the adjacent under-cut edges of a pair of opposite annular rings 28, the outer sides of which are shown as curved to bear snugly against the adjacent portions 6ª of the plates 6, these rings 28 being secured by any suitable means to the plates and are here shown as seated upon a band 29 encompassing the felly 5, the band forming the bottom of the grooves between the edge of the rings which are under-cut as at 30 to receive the head 27 of the stud bolt 25. The projecting edge of the rings 28 above the under-cut or shouldered portions 30 serve to prevent outward radial movement of the bolt and its connected piston. In the action of the device owing to the difference in the size of the interior wheel structure and the incasing tire device, these parts receive constantly while in operation, a relative motion which keeps their centers eccentric, and this constant relative change of position of one part of the wheel to another results in the reciprocation of the piston 20, it being held against radial movement on the felly 5, in its chamber 19, and for the purpose of providing for a limited free movement of the piston as to the felly, the under-cut shoulders or recessed portions 30 of the rings 28 are clearly shown in Figs. 1 and 4 as being substantially tangential to the outer portion of the band 29, so that there is provided a straight slot or channel way tangentially of the band 29 for each of the bolt heads 27 to reciprocate in to a limited degree. As shown in Fig. 1, when the axes of the pistons 10 are vertical, the uppermost piston is retracted from its chamber 19, while the lowermost piston is advanced in its chamber, and those of the pistons on opposite sides of the vertical chamber of the wheel assume positions proportionately varying between the upper part and the lower part of the wheel. Coincident with the relative radial change of position of the pistons in their chambers, there must be a relative peripheral change of position of the pistons, or what is the same, of the bolt heads of the pistons on the band 29 between the rings 28 as is shown, for instance, at the left portion of Fig. 1. From this, it will be seen that we have provided for a simple and direct connection, of a piston which reciprocates in a piston chamber, to the felly structure and has a straight sliding movement tangentially thereto.

Another feature of the present invention resides in means for positively limiting the movement of the piston tangentially along its channel as to the felly for the purpose of securing a driving connection and obtaining a tractive effort at the tread portion of the tire. To that end in the illustrated embodiment of this connection, the bolt 25 of each piston is shown as provided with a pair of tumblers 31 shown clearly in Fig. 5 as being of crescent form and disposed reverse to each other and centrally hung on the bolt 25, the extreme width of each tumbler 31 being somewhat greater than the distance between the parallel edges 32 of the rings 28 which are shown at opposite points as indented to form keepers 33 complementary to the ends of the tumblers 31. Upon a limited movement of a bolt 25 with its oppositely set tumblers 31, these later will be automatically thrown from the position shown in Fig. 5 into the position shown in Fig. 8, with their points interlocked in the keepers of the rings 28 so that after a limited sliding movement of the pistons along the tangential channels in the rings, then the piston becomes interlocked with the rings for tractive purposes. As the bolt, piston, and tumblers, engaged in the keepers as shown in Fig. 8, move, the tumblers are disengaged from the keepers and will assume the position shown in Fig. 5, and subsequently move into the keepers at the opposite ends, if movement is continued to a sufficient degree.

Another embodiment of our invention is shown in Fig. 9, and will be readily understood from a comparison of that figure with Fig. 3. In the embodiment shown in Fig. 3 and above described, it will be noted that side plates 6 are fastened to felly 5 by bolts 8 and extend outwardly through curves 6ª, terminating in projecting flanges 9 which are slidingly engaged on their outer surfaces by outer side plates 14 and on their inner surfaces by the edges 10ª of central portion 10; also that the outside contour of rings 28 is made to conform to the curves 6ª. In the embodiment shown in Fig. 9, however, the plates 36 are fastened to felly 5 by bolts 38 having their heads counter sunk in the plates 36 as at 39. The plates 36 are preferably co-terminus with the felly 5 as indicated at 40 and the outer edges and sides of band 29 and rings 28 are made flat and the band and rings so proportioned that these edges and sides will be in the same plane as the outer surfaces of plates 6 so that the outer surfaces of all of these members will join in forming a single flat surface, designated as surface 28—29—36.

Instead of outer side plates 14 terminating at the sliding contact with flanges 9 as in Fig. 3, these outer side plates, here designated as 34, are extended so as to inclose the plates 36, band 29 and rings 28, having sliding bearings on the surfaces 28—29—36. These outer side plates 34 are farther extended and brought together and their edges suitably fastened as by bolts 41 at 35, suitable openings in said edges being left for spokes 4. Suitable clearance is also provided between felly 5 and the outer side plates 34 as at 42.

In this embodiment edges of central portion 10 are fastened to outer side plates 34 by any suitable means as by forming therein suitable threaded sockets 10$^b$ for screw bolts 43.

By this construction a larger bearing surface (28—29—36) is provided for the sliding connection between the felly and its associated parts on the one hand and the tire and its associated parts on the other hand. Also rigidity and strength are gained with no loss of resilience. A further advantage of this latter construction lies in the fact that the tire and outer side plates 34 form a casing inclosing all working parts and having the only opening therein for the entrance of dirt or other foreign substances (namely, the opening around the spokes) at a comparatively great distance from the tread of the tire, and, therefore, from the ground, thereby lessening the danger of the entry of dirt and other foreign substances to the working parts or bearing surfaces.

What we claim is:

1. A liquid cushion wheel comprising a central body having a felly, a tire structure having a continuous liquid chamber, pistons and chambers therefor communicating therewith, said pistons having a limited tangential sliding movement on the felly.

2. A liquid cushion wheel comprising a central body having a felly, provided with tangential seats; a tire structure having a continuous liquid chamber, pistons and chambers therefor communicating therewith, said pistons slidably connected with the felly seats.

3. A liquid cushion wheel comprising a central body having a felly, a tire structure having a continuous liquid chamber, pistons and chambers therefor communicating therewith, said pistons slidably connected with the felly, and means automatically operative to interlock the felly and tire against relative rotation.

4. The combination of a wheel having a felly with tangential seats, a tire structure having guided radial movement thereon and provided with a series of related piston chambers, and pistons slidable therein and directly and slidably engaging the said seats on the felly and means for holding the pistons to the seats against axial movement.

5. The combination of a wheel having a felly, a tire structure having guided radial movement thereon and provided with a series of related piston chambers, and pistons slidable therein and directly and slidably engaging the felly, and means for interlocking the pistons and felly after limited movement, said chambers containing a liquid for controlling the actions of the pistons.

6. The combination of a wheel having a felly, a tire structure having guided radial movement thereon and provided with a series of related piston chambers, and pistons slidable therein and directly and slidably engaging the felly, and means for interlocking the pistons and felly after limited movement including a series of tumblers, connected to the pistons and engageable with keepers on the felly, said chambers containing a liquid for controlling the actions of the pistons.

In testimony whereof we affix our signatures.

CLAUDE T. SMITH,
GEORGE W. FORSYTHE.